(12) United States Patent
Fujimoto et al.

(10) Patent No.: US 9,638,146 B2
(45) Date of Patent: May 2, 2017

(54) GASOLINE DIRECT-INJECTION ENGINE

(71) Applicant: Mazda Motor Corporation, Aki-gun, Hiroshima (JP)

(72) Inventors: Masahiko Fujimoto, Hiroshima (JP); Yuji Harada, Higashihiroshima (JP); Masatoshi Seto, Hatsukaichi (JP); Hiroyuki Yamashita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 111 days.

(21) Appl. No.: 14/629,212

(22) Filed: Feb. 23, 2015

(65) Prior Publication Data
US 2015/0240758 A1 Aug. 27, 2015

(30) Foreign Application Priority Data
Feb. 26, 2014 (JP) ................. 2014-035629

(51) Int. Cl.
*F02M 25/12* (2006.01)
*F02B 3/08* (2006.01)
(Continued)

(52) U.S. Cl.
CPC ............... *F02M 25/12* (2013.01); *F02B 3/08* (2013.01); *F02D 41/0025* (2013.01);
(Continued)

(58) Field of Classification Search
CPC ........ F02P 23/045; F02P 15/006; F02P 19/02; F02P 23/04; F02P 9/007
(Continued)

(56) References Cited

U.S. PATENT DOCUMENTS 4,265,201 A * 5/1981 Gerry .................. F02P 3/01
123/260
5,913,809 A * 6/1999 Erlichman ............. F02M 25/12
60/272
(Continued)

FOREIGN PATENT DOCUMENTS

JP 2002309941 A 10/2002
JP 2012241590 A 12/2012

*Primary Examiner* — Long T Tran
(74) *Attorney, Agent, or Firm* — Alleman Hall McCoy Russell & Tuttle LLP

(57) ABSTRACT

A gasoline direct-injection engine is provided. The engine performs compression self-ignition combustion, and includes a cylinder, an injector, intake and exhaust ports, intake and exhaust valves, and an ozone generating system for generating ozone inside the cylinder. The system includes an electrode projecting into the cylinder while being partially electrically insulated from walls of the cylinder, and a high-voltage control device for applying a controlled pulse-shaped voltage to the electrode. When the voltage is applied, electric discharge occurs between the non-insulated part of the electrode and the walls of the cylinder, and ozone is generated inside the cylinder due to an effect of the electric discharge. A combustion pattern is provided, in which a compression stroke injection is performed and mixture gas formed by the fuel injection self-ignites to combust. When the combustion pattern is applied, the high-voltage control device is operated on intake stroke or the compression stroke.

14 Claims, 12 Drawing Sheets

(51) Int. Cl.
*F02D 41/00* (2006.01)
*F02D 41/40* (2006.01)
*F02D 41/30* (2006.01)

(52) U.S. Cl.
CPC ........ *F02D 41/402* (2013.01); *F02D 41/3041* (2013.01); *F02D 2041/3052* (2013.01); *Y02T 10/44* (2013.01)

(58) Field of Classification Search
USPC .............................. 123/3, 294, 297, 305, 429
See application file for complete search history.

(56) References Cited

U.S. PATENT DOCUMENTS

| | | | | |
|---|---|---|---|---|
| 6,622,689 B2* | 9/2003 | Hasegawa | ................. | F01L 1/34 123/294 |
| 8,205,600 B2* | 6/2012 | Hammer | ................. | F02M 25/12 123/539 |
| 8,327,816 B2* | 12/2012 | Ikeda | ..................... | B01D 53/32 123/143 R |
| 8,365,707 B2* | 2/2013 | Ikeda | ...................... | F02B 23/08 123/536 |
| 2002/0195078 A1* | 12/2002 | Hasegawa | ................. | F01L 1/34 123/294 |
| 2004/0071614 A1* | 4/2004 | Kravitz | ................... | C01B 13/11 422/186.07 |
| 2009/0229581 A1* | 9/2009 | Ikeda | ..................... | B01D 53/32 123/536 |
| 2011/0025210 A1* | 2/2011 | Ikeda | ..................... | F02B 23/08 315/111.21 |
| 2011/0031886 A1* | 2/2011 | Ikeda | ....................... | F01L 3/02 315/111.21 |
| 2011/0056445 A1* | 3/2011 | Plata | ....................... | C01B 13/11 123/3 |

* cited by examiner

GASOLINE DIRECT-INJECTION ENGINE

BACKGROUND

The present invention relates to an engine, which is for vehicles (e.g., automobiles), and for directly injecting fuel containing gasoline into cylinders and performing compression self-ignition combustion (CI combustion), and it particularly relates to an art for utilizing ozone.

CI combustion is a combustion mode in which self-ignition of mixture gas containing gasoline is caused by compressing the mixture gas within cylinders to increase a temperature and pressure thereof. Unlike a conventional combustion mode (spark ignition) in which the mixture gas is ignited by spark ignition, and the flame produced thereby propagates to cause combustion, with the CI combustion, the mixture gas ignites at various positions within each cylinder simultaneously. Since the CI combustion has a shorter combustion period compared to the spark ignition, lower fuel consumption and lower $NO_x$ production can be expected.

On the other hand, the CI combustion has a disadvantage that an operating range for the CI combustion to be performed stably is narrow. Therefore, to stimulate the CI combustion, an ignition assist for inducing a plurality of simultaneous ignitions by performing the spark ignition within a predetermined operating range is performed. For example, JP2012-241590A discloses such an art. However, to perform such an ignition assist, installation and control of an ignition plug are required.

Moreover, as another method of stimulating the CI combustion, ozone application is utilized. By suitably mixing ozone with the mixture gas within the cylinder, the self-ignition can be induced and, thus, the CI combustion especially at a low temperature can be expected to be stimulated. Such stimulation of the CI combustion by ozone is disclosed in JP2002-309941A.

With the engine in JP2002-309941A, ozone is generated by an ozone generating device and is supplied into the cylinder. Specifically, the fuel and ozone are supplied into the cylinder during compression stroke so that the ozone can be well mixed with the mixture gas while being efficiently supplied into the cylinder.

Although a detailed configuration of the ozone generating device is not disclosed in JP2002-309941A, a silent electric discharging method using dielectric barrier electric discharge is generally used in ozone generating mechanisms of conventional ozone generating devices.

FIG. 1 is a view illustrating a basic structure of a main part (cell 100) of an ozone generating device which adopts such a silent electric discharging method. The cell 100 is comprised of a pair of electrodes 101 connected with a high-frequency high-voltage power source, and a dielectric body 102 having electric insulation properties, such as glass.

The pair of electrodes 101 are disposed to face each other via a gap, and the dielectric body 102 is attached to one or both (in FIG. 1, both) of the opposing surfaces of the electrodes 101. According to the shape of the electrodes 101, the cell 100 is formed into a plate or a tube, for example.

In generating ozone, a pulse-shaped high voltage is applied between both of the electrodes 101 so that electricity is discharged in the gap between the electrodes 101, and material gas containing oxygen, such as air, is supplied to the gap where the electricity is discharged. In this manner, ozone is generated by the material gas passing through the gap. The applied voltage is generally about a few kV to a few 10 kV with a pulse width of about a few μs to a few 10 μs (microseconds).

The dielectric bodies 102 prevent a high current from flowing between the electrodes 101 so that a spark or heat is not generated between the electrodes 101 by a high voltage application. However, a voltage loss is caused by the dielectric bodies 102, and thus the silent electric discharging method has disadvantages in terms of ozone generation efficiency and energy utilization efficiency.

In generating ozone with the ozone generating device as above, in addition to the disadvantages in ozone generation efficiency and energy utilization efficiency, if the ozone is supplied into the cylinder from the ozone generating device, ozone will be reduced and the energy will be lost also during the supplying process.

Therefore, engines in which ozone generated by an ozone generating device is supplied into cylinders have disadvantages in terms of ozone generation efficiency and energy utilization efficiency. Moreover, since the ozone needs to be suitably mixed with intake air and the supply of ozone requires time, a disadvantage in terms of responsiveness in control also rises.

To reduce such disadvantages, with the engine in JP2002-309941A, ozone is supplied into the cylinder during the compression stroke; however, since ozone is a gas, it needs to be pressured by a higher pressure than the in-cylinder pressure before being supplied, and the device structure and the control thereof inevitably become complicated.

SUMMARY

The present invention is made in view of the above situations and provides a gasoline direct-injection engine, which is able to effectively utilize ozone and realize stable CI combustion.

According to one aspect of the present invention, a gasoline direct-injection engine where compression self-ignition combustion in which mixture gas containing gasoline self-ignites inside a cylinder is performed is provided. The engine includes a cylinder having a volume that changes as a piston reciprocates inside the cylinder, an injector for directly injecting fuel at least containing gasoline into the cylinder, an intake port for introducing intake air into the cylinder through an inlet, an exhaust port for discharging exhaust gas from inside of the cylinder through an outlet, an intake valve for opening and closing the inlet, an exhaust valve for opening and closing the outlet, and an ozone generating system for generating ozone inside the cylinder.

The ozone generating system includes an electrode projecting into the cylinder while being electrically insulated from walls of the cylinder except for a part of the electrode that is within the cylinder, and a high-voltage control device for applying a controlled pulse-shaped voltage to the electrode. When the high-voltage control device is operated to apply the voltage to the electrode, electric discharge occurs between the part of the electrode within the cylinder and the walls of the cylinder, and ozone is generated inside the cylinder due to an effect of the electric discharge.

A combustion pattern for performing at least a compression stroke injection in which the injector injects the fuel on compression stroke, and causing mixture gas formed by the fuel injection to self-ignite to combust is provided. When the combustion pattern is applied, the high-voltage control device is operated on at least either one of an intake stroke and the compression stroke.

In other words, with the engine, since the ozone can be generated directly inside the cylinder by using the effect of the electric discharge which is caused between the electrode and the walls of the cylinder, improvements in ozone generation efficiency and energy utilization efficiency, suitable mixing of the ozone with the intake air, and improvement in responsiveness in control can be obtained, and thus, stable CI combustion can be realized.

Further, the combustion pattern for performing at least the compression stroke injection in which either one of gasoline and the fuel containing gasoline is injected on compression stroke is provided, and when the combustion pattern is applied, the high-voltage control device is operated on at least either one of the intake stroke and the compression stroke, and ozone is generated inside the cylinder.

With the engine, since ozone can be generated simply by applying the voltage to the electrode, even on the compression stroke where the cylinder is sealed, ozone can be generated inside the cylinder simply by changing the control pattern. Therefore, according to this engine, ozone can be generated inside the cylinder at a suitable timing according to an amount of the fuel to be injected in the compression stroke injection during the intake stroke before the compression stroke injection is performed and the compression stroke. Thus, the ozone generation efficiency and the energy utilization efficiency can be improved more, and more stable CI combustion can be realized.

It is particularly preferred for the compression stroke injection to be performed such that the mixture gas concentrates more within a central section of the inside of the cylinder than other parts of the inside of the cylinder, and more preferably, that an air layer is formed between the mixture gas and an inner surface of the cylinder before a timing at which the mixture gas self-ignites.

When the fuel injection amount is reduced within a part of an operating range of the engine, such as a low engine load part, a concentration of the mixture gas becomes thin and ignition stability easily degrades; however, by performing the compression stroke injection such that the mixture gas concentrates within the central section of the inside of the cylinder, the concentration of the gasoline within the mixture gas can be maintained, which suppresses the degradation in ignition stability. Adhesion of matters, such as soot, can also be suppressed.

With the air layer intervening between the mixture gas and the inner surface of the cylinder, release of heat in the combustion can be prevented by the air layer (air layer heat insulation). Therefore, the energy utilization efficiency can be improved.

Further, when the high-voltage control device is operated on the intake stroke, the fuel is preferably injected on the intake stroke in conjunction with the operation of the high-voltage control device, by an amount smaller than an amount in the compression stroke injection.

In this manner, the ozone can be efficiently generated on the intake stroke, and thus, the ozone can be distributed at a comparatively high concentration, to the entire intake air before entering the compression stroke.

As a result, the ozone spreads out sufficiently to induce the self-ignition, and therefore, incomplete combustion can effectively be reduced.

In such a case, it is particularly preferred that an operating period of the high-voltage control device includes a period in which an introducing amount of the intake air reaches a largest amount.

In this manner, the generation of ozone and the mixing thereof can be stimulated even more.

Moreover, the high-voltage control device may be operated on the compression stroke in conjunction with the compression stroke injection.

In this manner, ozone can be generated even on the compression stroke, and therefore, the ignition stability can be improved even more. Particularly with this engine, since ozone can be generated simply by applying the voltage to the electrode, ozone can be generated inside the cylinder on the compression stroke where the cylinder is sealed, simply by changing the control pattern. Since a flow of the intake air occurs by the momentum of the injected fuel even inside the sealed cylinder on the compression stroke, high ozone generation efficiency can be obtained.

For example, the high-voltage control device may be operated on the intake stroke when the injection amount of fuel is relatively small, and the high-voltage control device may be operated on the compression stroke when the injection amount of fuel is relatively large.

In this manner, since ozone can suitably be generated corresponding to the fuel injection amount, stable CI combustion can be realized over a wide part of the operating range of the engine.

DETAILED DESCRIPTION OF EMBODIMENTS

Figure 1:
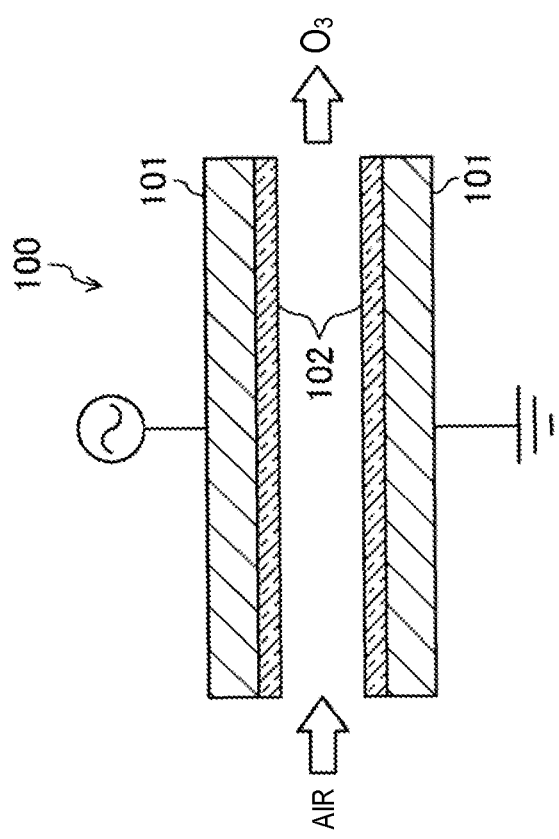
FIG. 1 is a schematic view illustrating a main part of a conventional ozone generating device.

Hereinafter, one embodiment of the present invention is described with reference to the appended drawings. Note that, the following description is essentially merely instantiation, and it is not intended to limit the scope, application or use of the present invention.

A gasoline direct-injection engine disclosed here (may simply be referred to as the engine 1) utilizes ozone in combustion; however, the ozone generated by an ozone generating device is not supplied into cylinders 2 of the engine 1, but is directly generated inside each cylinder 2 by applying a particular art for electric discharge. Therefore, this art for electric discharge is first described.

(Electric Discharge within Cylinder)

To improve ozone generation efficiency, the development of arts for generating ozone without intervention of a dielectric body, by applying, for example, a high voltage of about a few 10 kV with an extremely-short pulse width of a few 10 nanoseconds to cause electric discharge (here, referred to as extremely-short pulsed electric discharge) has been performed.

Figure 2:
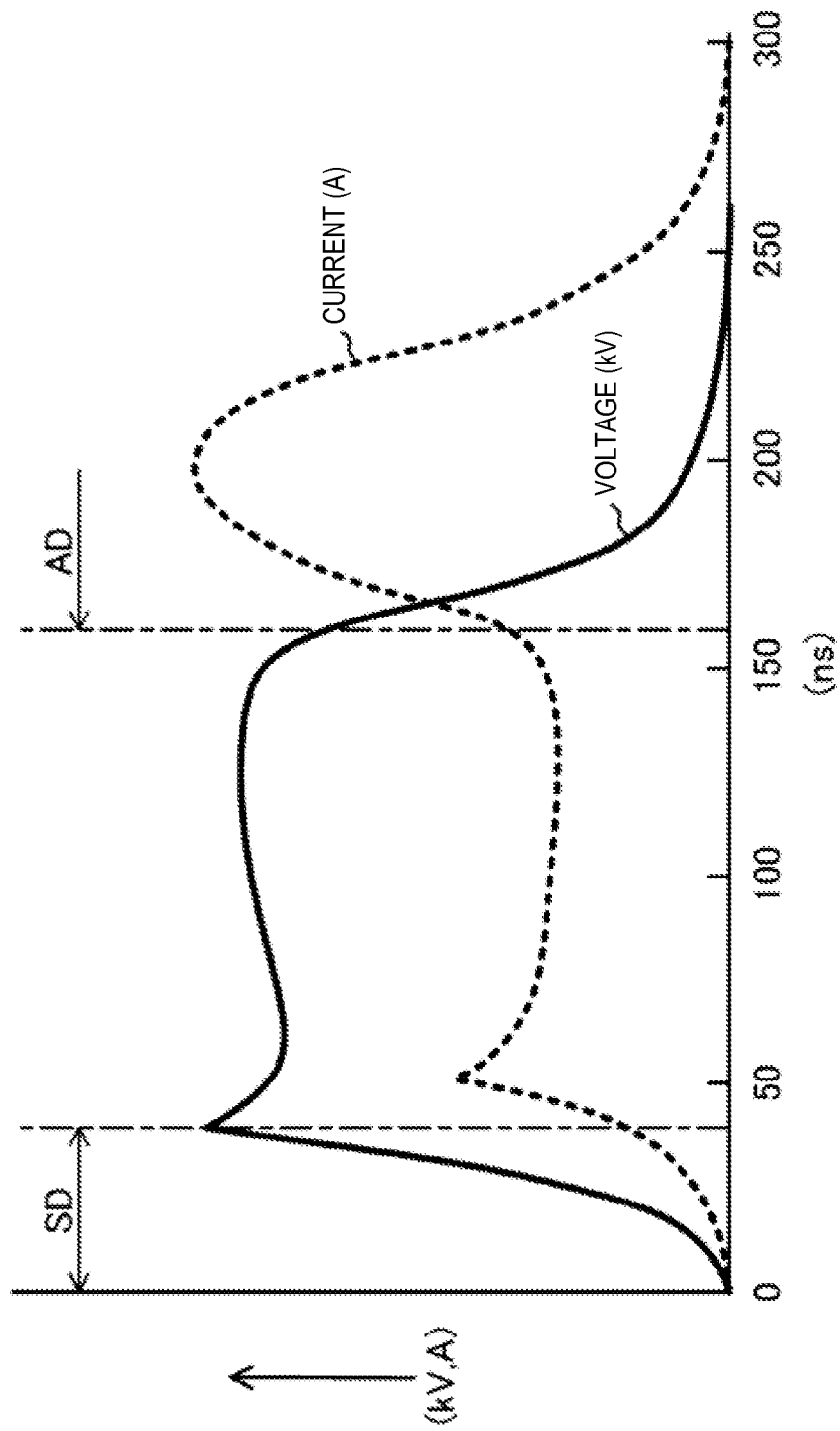
FIG. 2 is a chart describing an extremely-short pulsed electric discharge.

FIG. 2 schematically illustrates an example of changes in a current and voltage while a high voltage is applied for an extremely short period of time. Note that, in FIG. 2, a predetermined high voltage of 10 kV or higher is applied for a predetermined period of time of 50 nanoseconds or shorter.

A current increases after a voltage increases. Therefore, at a timing for the voltage to reach the predetermined high voltage, the current hardly flows. Then, the voltage is kept at high voltage for a while, and the current slightly flows. Further later, the current sharply increases, and when a high current flows between electrodes, the voltage drops.

Within an early range for the voltage to reach the predetermined high voltage, streamer electric discharge occurs (streamer electric discharge range SD), and within a latter range where the voltage drops and the current sharply increases, arc electric discharge occurs (arc electric discharge range AD). An intermediate range between the ranges SD and AD is a transition range.

Within the transition range and the arc electric discharge range AD where the current flows, there is a possibility of causing a spark, heat or the like, whereas within the streamer electric discharge range SD where the current hardly flows, there is no such possibility. Therefore, by applying the high voltage with extremely-short pulse width which does not exceed the voltage within the streamer electric discharge range SD, ozone can be stably generated without the intervention of the dielectric body between the electrodes, and the ozone generation efficiency can be improved.

With the engine 1 disclosed here, such extremely-short pulsed electric discharge is applied. Thus, the streamer electric discharge can be stabilized without causing a spark or the like inside the cylinder, and ozone can be directly generated from intake air inside the cylinder.

(Basic Configuration of Engine)

Figure 3:
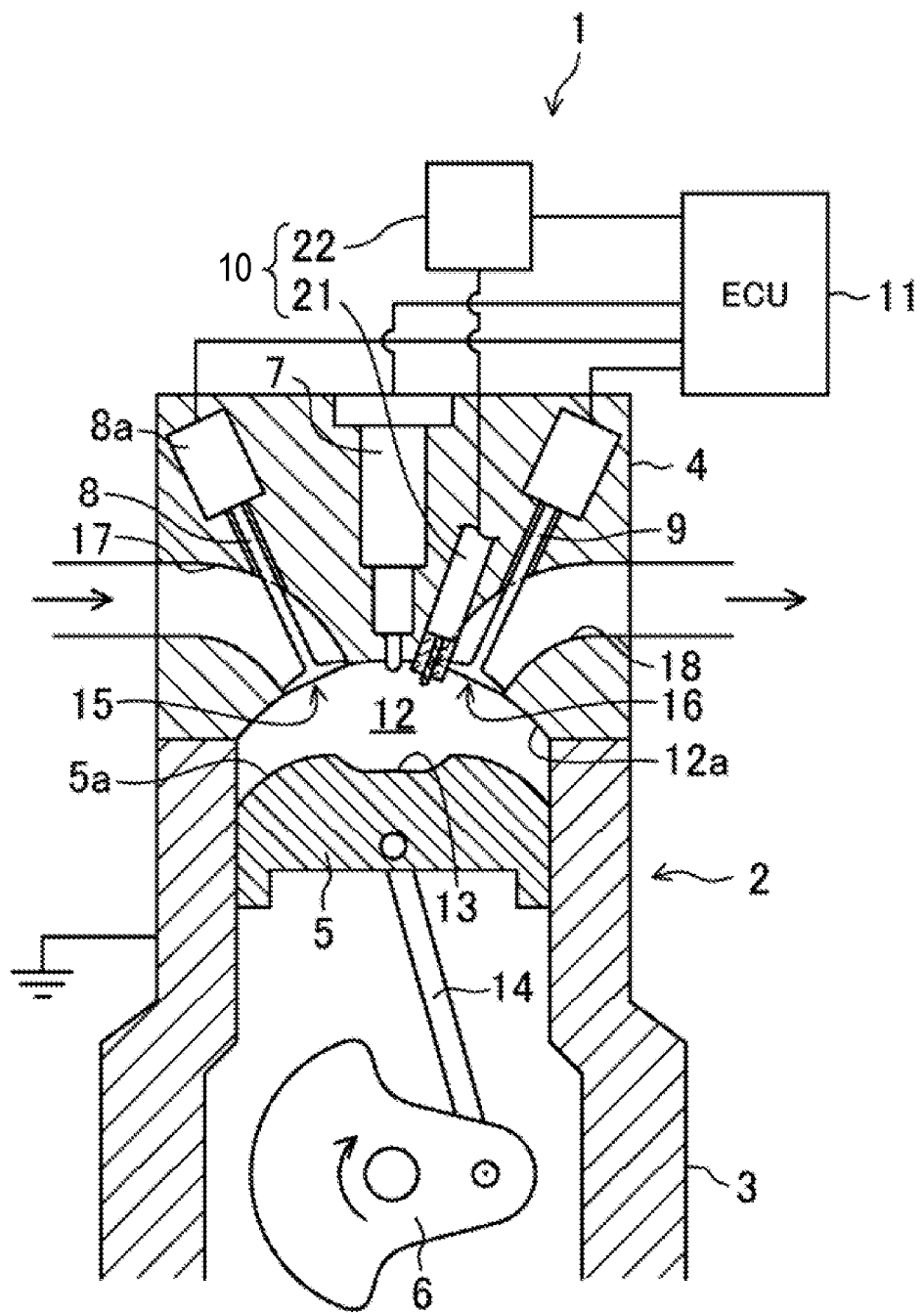
FIG. 3 is a schematic view illustrating a basic structure of an engine according to one embodiment of the present invention.

FIG. 3 illustrates a basic configuration of the engine 1 of this embodiment. The engine 1 is a four-cycle multi-cylinder engine to be installed in an automobile. Combustion is performed by directly injecting the fuel, gasoline, into cylinders 2. Note that, since each cylinder 2 has a similar main configuration, only one of the cylinders 2 is illustrated in the drawings.

Moreover, the engine 1 is designed to perform CI combustion within an entire operating range of the engine 1. Therefore, an ignition plug is not equipped. Specifically, the engine 1 includes a cylinder block 3, a cylinder head 4, pistons 5, a crankshaft 6, injectors 7, intake valves 8, exhaust valves 9, an ozone generating system 10, and an ECU 11.

Each of at least the cylinder block 3, the cylinder head 4, and the pistons 5 is made of metal having electric conductivity, such as aluminum alloy and grounding (earthing) is implemented.

The cylinders 2 are formed inside the cylinder head 4 and the cylinder block 3 which are integrated by being connected with each other in up-and-down directions of the engine 1, to line along the crankshaft 6. The cylinder head 4 covers the top of each cylinder 2 and the bottom of each cylinder 2 is covered by a top surface 5a of the piston 5. Thus, an air-sealed space (combustion chamber 12) is formed inside the cylinder 2.

An upper surface 12a of the combustion chamber 12 is formed into a spherical shape bulging upward (dome). The top surface 5a of the piston 5 is also formed into such a dome shape corresponding to the shape of the upper surface 12a. A cavity 13 recessed in a disk shape is formed in a central section of the top surface 5a of the piston 5.

Each piston 5 is coupled to the crankshaft 6 via a connecting rod 14 and elevates and descends along an axis of the cylinder 2. Specifically, the piston 5 reciprocates between a top dead center (TDC) of the piston 5 and a bottom dead center (BDC) of the piston 5 in a series of cycles including intake stroke, compression stroke, expansion stroke, and exhaust stroke. The top dead center of the piston 5 is a position where the top surface 5a approaches the top surface 12a of the combustion chamber 12 the most and the bottom dead center of the piston 5 is a position where the top surface 5a separates from the top surface 12a of the combustion chamber 12 the most.

Figure 4:
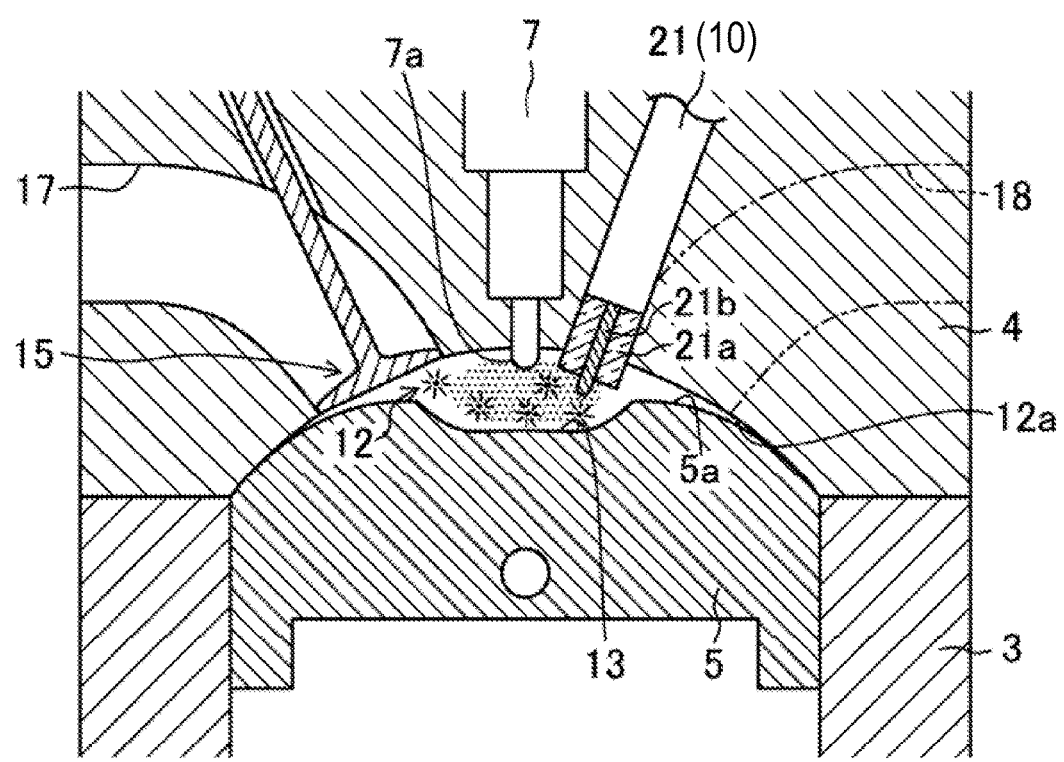
FIG. 4 is a schematic view illustrating a state of a piston at its top dead center on compression stroke.

For example, FIG. 4 schematically illustrates a state of the piston 5 at the TDC on the compression stroke. In this state, mixture gas containing gasoline and intake air (in this engine 1, ozone may be contained as well) and formed by the injector 7 performing a fuel injection is tightly compressed to have a high temperature and pressure.

Therefore, the mixture gas self-ignites on the compression stroke and thus combusts (CI combustion). In utilizing the energy generated by the combustion, the volume of the combustion chamber 12 continuously varies and the crankshaft 6 rotates, and this rotational force is outputted from the engine 1 as a drive force.

The injector 7 is provided to the cylinder head 4. An injection port 7a formed in a tip portion of the injector 7 is oriented toward inside the combustion chamber 12 from a central section of the top surface 12a of the combustion chamber 12, which is the top of the top surface 12a, so as to directly inject the gasoline into the combustion chamber 12. The injector 7 injects the gasoline such that it radially spreads from the central section of the top surface 12a of the combustion chamber 12 toward the bottom of the combustion chamber 12.

As the injector 7, a piezo injector 7 which can accurately control an opening of the injection port 7a is used. Therefore, with the engine 1, a highly accurate control of an injection (spray) amount and an injection (spray) timing and the like per unit of time can be performed even at a high engine speed.

Adjacently to the injector 7, the top surface 12a of the combustion chamber 12 is formed with an inlet 15 and an outlet 16. The combustion chamber 12 communicates, through the inlet 15, with an intake port 17 formed in the cylinder head 4. The intake port 17 is connected with an intake passage (out of range of the drawings) and the intake air (air which is taken from outside of the vehicle) is introduced into the combustion chamber 12 through the intake port 17 and the inlet 15. Note that, in a case where an EGR system is equipped to the engine 1, the intake air may contain exhaust gas.

Moreover, the combustion chamber 12, through the outlet 16, communicates with an exhaust port 18 formed in the cylinder head 4. The exhaust port 18 is connected with an exhaust passage (out of range of the drawings) and exhaust gas (combusted gas) is discharged to the exhaust passage from the combustion chamber 12 through the outlet 16 and the exhaust port 18. The exhaust gas discharged to the exhaust passage, for example, is purified by a catalyst converter and then discharged outside of the vehicle through a muffler.

Intake valves 8 and exhaust valves 9 are provided to the cylinder head 4. The intake valves 8 and exhaust valves 9 are controlled by valve operating systems to open and close the inlets 15 and the outlets 16 at predetermined timings, respectively.

A valve operating system 8a, provided to the intake valve 8, is built as a variable valve operating mechanism (continuously variable valve lift: CVVL) for continuously varying a lift of the intake valve 8 (amount projecting to and retreating from the inside of the combustion chamber 12). Therefore, with the engine 1, an amount and timing of the intake air to be introduced into the combustion chamber 12 can be controlled highly accurately by the variable valve operating mechanism.

The ozone generating system 10 is installed to generate ozone inside the combustion chamber 12, and includes discharge plugs 21 and a high-voltage control device 22.

The discharge plugs 21 are provided to the cylinder head 4, and a tip part of each of the discharge plugs 21 projects to each combustion chamber 12 from a position of the top surface of the combustion chamber 12 adjacent to the injection port 7a. A stick-shaped electrode 21b, the surrounding of which is electrically insulated by an insulator 21a, is provided to the tip part of the discharge plug 21. Thus, the electrode 21b projects to the combustion chamber 12 while being electrically insulated from the cylinder head 4 and the cylinder block 3 except for a part of the electrode 21b that is within the combustion chamber 12.

The high-voltage control device 22 is electrically connected with each discharge plug 21, and has a function to apply a controlled pulse-shaped high voltage to the electrode 21b so as to cause the extremely-short pulsed electric discharge in the combustion chamber 12.

Figure 5:
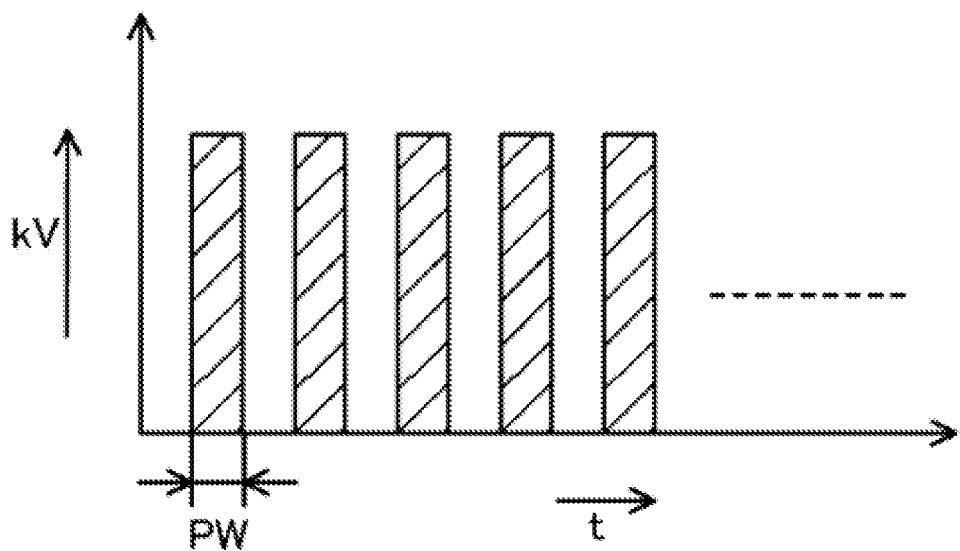
FIG. 5 is a chart schematically illustrating an example of a short-pulsed high voltage outputted from a high voltage control device.

Specifically, as illustrated in FIG. 5, the high-voltage control device 22 has a function to apply a high voltage of about 10 kV or higher with a pulse width PW of 50 nanoseconds or shorter (short-pulsed high voltage) to the electrode 21b intermittently for a predetermined period of time.

The ECU 11 has hardware (e.g., a CPU, a ROM and a RAM) and software (e.g., various control programs), and has a function to comprehensively control each device provided to the engine 1.

Figure 6:
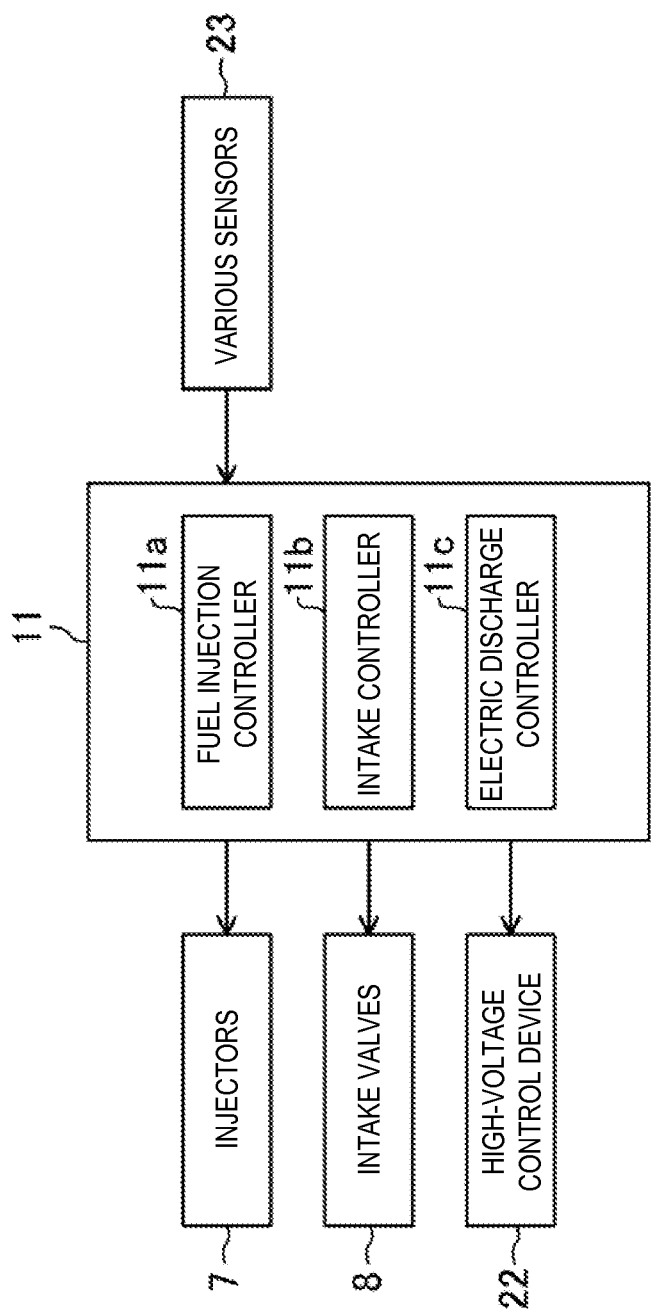
FIG. 6 is a block diagram schematically illustrating a main configuration of an ECU.

Specifically, as illustrated in FIG. 6, the ECU 11 is provided with a fuel injection controller 11a for controlling fuel injections in cooperation with the injectors 7, an intake controller 11b for controlling the intake air in cooperation with the intake valves 8, and an electric discharge controller 11c for controlling the electric discharge in cooperation with the high-voltage control device 22. Note that, although the ECU 11 is also provided with other components, such as an exhaust air controller for controlling the exhaust gas in cooperation with the exhaust valves 9, these are omitted for the sake of convenience.

Further, the ECU 11 determines an operating state of the engine 1 based on information inputted from various sensors 23 including a crank angle sensor, an accelerator sensor, and a brake sensor, and a predetermined control map, and the ECU 11 performs a control such that the fuel injections, the intake process, and the electric discharge are performed corresponding to the operating state.

(Specific Configuration of Engine)

The engine 1 is devised to be able to stably perform the CI combustion over a wide part of the operating range, even at low temperatures.

Specifically, by generating ozone, which induces self-ignition, directly from the intake air in the combustion chamber 12, improvements in ozone generation efficiency and energy utilization efficiency, suitable mixing of the ozone with the intake air inside the combustion chamber, and improvement in responsiveness in control are realized.

Specifically, since earthing is implemented to the cylinder head 4, the cylinder block 3 and the like forming the cylinders 2, when the short-pulsed high voltage is applied to the electrode 21b, an anode and a cathode are created by an inner surface of the cylinder 2 (specifically, an inner surface of the combustion chamber 12) and the electrode 21b, and the electric discharge occurs between the anode and the cathode (the electrode 21b corresponds to the anode and the cylinder 2 corresponds to the cathode). Then, ozone is generated due to an effect of the electric discharge.

Since the applied voltage is controlled to the predetermined short pulsed high voltage, only the streamer electric discharge occurs in the combustion chamber 12. Therefore, there is no risk of causing a spark or heat. Since a dielectric body does not intervene and also ozone is directly generated inside the combustion chamber 12, high ozone generation efficiency and high energy utilization efficiency can be obtained.

Further, in the engine 1, a control pattern in which the injector 7 injects the gasoline on the compression stroke is set (compression stroke injection). Moreover, the engine 1 is devised such that in the case where the compression stroke injection is applied, the high-voltage control device 22 operates at least on one of the intake stroke and the compression stroke and the CI combustion can be performed stably.

First, with the engine 1, a control pattern in which in the case where the compression stroke injection is applied, an opening control of the injection port 7a of the injector 7 is performed is set in the fuel injection controller 11a so that the mixture gas concentrates more within the central section of the combustion chamber 12 than within parts other than the central section. In this manner, adhesion of soot or the like on the inner surface of the combustion chamber 12 is reduced and an air layer is formed between the mixture gas and the inner surface of the combustion chamber 12 before a timing at which the mixture gas self-ignites.

With the air layer intervening between the mixture gas and the inner surface of the combustion chamber 12, the combustion heat of the mixture gas can be prevented, by the air layer, from being released to the cylinder block 3 or the like (air layer heat insulation). Therefore, the energy utilization efficiency can be improved.

Moreover, for example, within a low engine load part of the operating range of the engine, the injection amount of the gasoline in the compression stroke injection becomes small, thus the gasoline amount with respect to the intake air is reduced and a concentration of the mixture gas becomes thin, and therefore, ignition stability easily degrades; however, with the engine 1, due to the combination of the piezo injector 7 with the fuel injection controller 11a, for the case where the gasoline injection amount is small, a control pattern in which the diffusion of the gasoline is suppressed by reducing the injection pressure is set.

Figure 7:
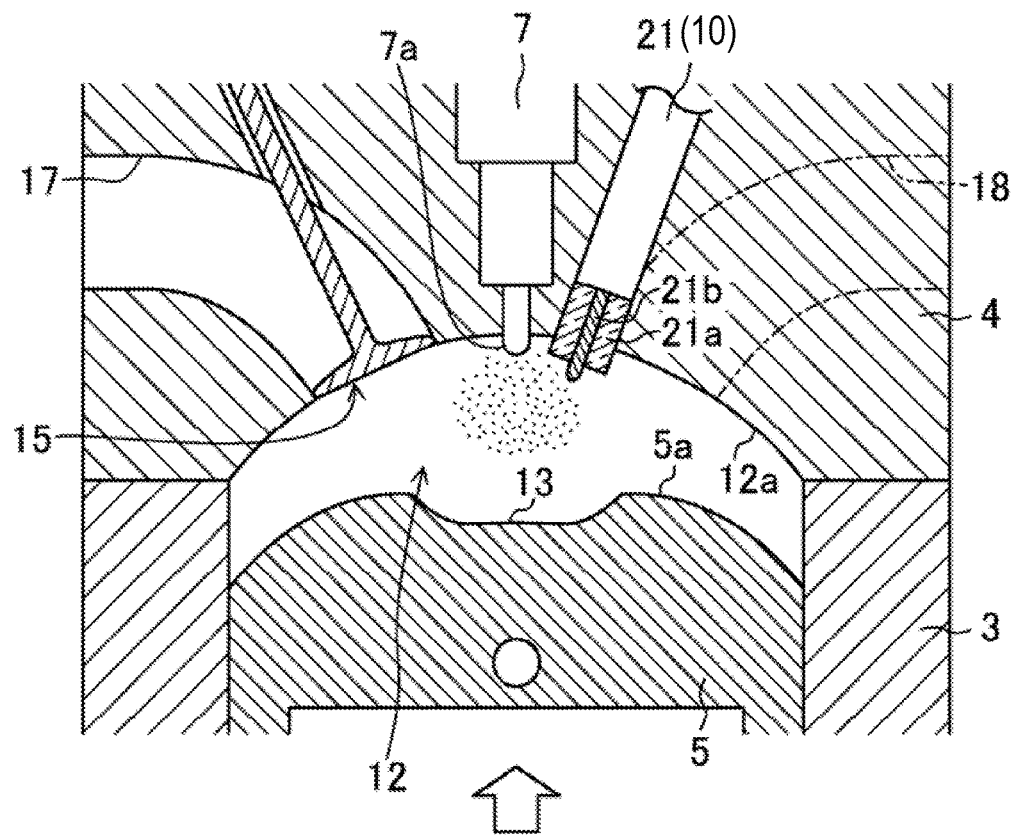
FIG. 7 is a schematic view illustrating a predetermined process on the compression stroke.

Thus, as illustrated in FIG. 7, a small mass of the mixture gas can be formed in an upper side of the central section of the combustion chamber 12, and therefore, even with the small gasoline injection amount, the concentration of the mixture gas can be kept high, and the degradation of the ignition stability can be suppressed.

However, in such a case, the air layer is formed to be relatively large, and therefore, the combustion in the boundary area between the mixture gas and the air layer may become incomplete. Therefore, to achieve complete combustion even in such a case, with the engine 1, a control pattern in which the high-voltage control device 22 operates to cause electric discharge inside the combustion chamber 12 on the intake stroke where the intake air flows into the combustion chamber 12 is set.

Figure 8:
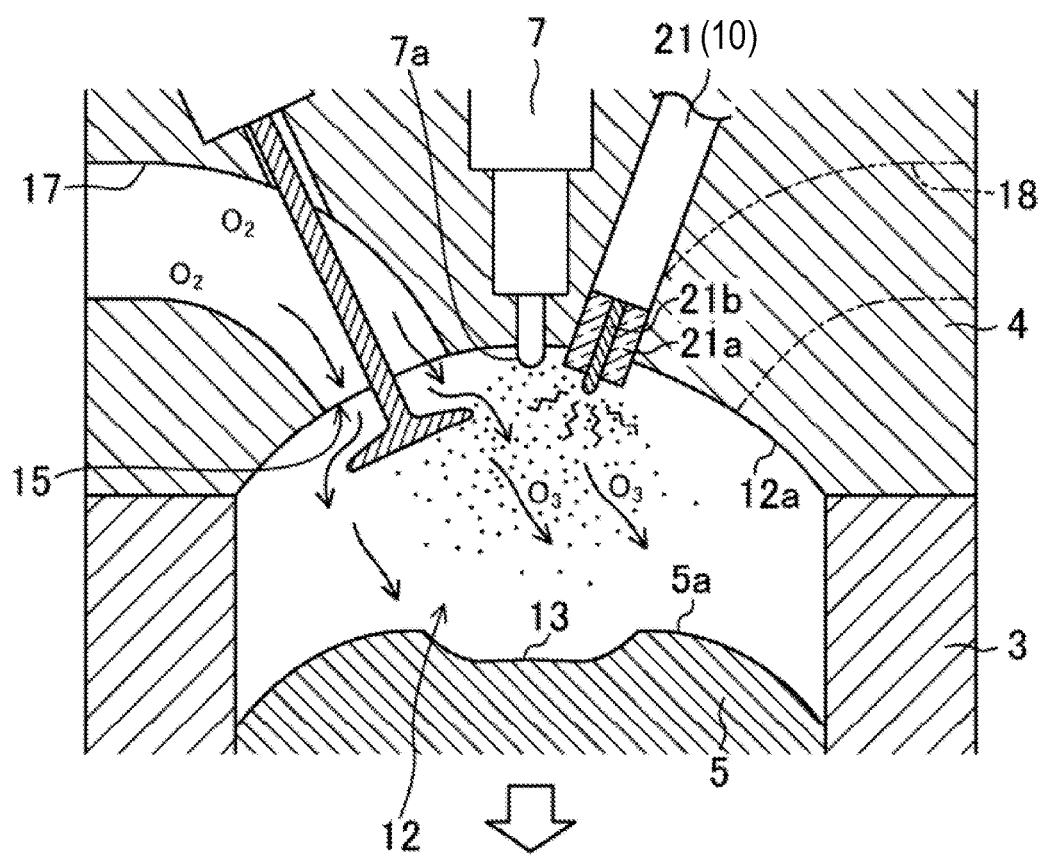
FIG. 8 is a schematic view illustrating a predetermined process on intake stroke.

Specifically, as illustrated in FIG. 8, after the intake valve 8 is opened, in synchronization with the timing at which the intake air is introduced into the combustion chamber 12, the short-pulsed high voltage is applied to the electrode 21b. In this manner, the intake air (oxygen) is supplied unremittingly near the electrode 21b where the electric discharge occurs (electric discharge space), and the matter therewithin switches between the generated ozone and the intake air.

As a result, the ozone can be generated while hardly receiving influence of the saturation concentration of the ozone, and thus, higher improvements in the ozone generation efficiency and the energy utilization efficiency can be obtained. Moreover, the mixing between ozone and the intake air is also stimulated.

Here, it is preferred that the operating period of the high-voltage control device 22 includes a period in which the introducing amount of the intake air reaches its largest amount. Specifically, the short-pulsed high voltage is applied to the electrode 21b from slightly before to slightly after the timing at which the lift of the intake valve 8 reaches its highest amount (90 ATDC). In this manner, the generation of ozone and the mixing thereof can be stimulated more.

Further, with the engine 1, the injector 7 is set to supplementarily inject a small amount of gasoline in conjunction with the operation of the high-voltage control device 22 on the intake stroke.

On the intake stroke, since the piston 5 descends, the top surface 5a of the piston 5 separates farther from the electrode 21b. Since the area which functions as the cathode is reduced as the piston 5 separates, the electric discharge space becomes smaller, which may cause degradation in the ozone generation efficiency.

Drops of the gasoline have a lower electric resistance than air. Therefore, electrons caused by the electric discharge tend to flow toward the drops. Thus, with the engine 1, by supplementarily injecting the gasoline in synchronization with the timing at which the short-pulsed high voltage is applied to the electrode 21b, the electric discharge space is expanded within the combustion chamber 12, so that also when the piston 5 descends, the ozone generation efficiency can be improved.

Note that, the gasoline injected here is not used for gaining combustion energy, but for assisting the ozone generation. Therefore, the required amount of the gasoline is smaller than that in the compression stroke injection. Moreover, in the supplementary injection here, it is preferred to diffuse the gasoline more than in the compression stroke injection by increasing the injection pressure to be larger than that in the compression stroke injection.

In this manner, the ozone can be distributed at a comparatively high concentration, to the entire intake air before entering the compression stroke. As a result, the ozone also spreads over the boundary area between the mass of the mixture gas formed on the compression stroke and the air layer and the self-ignition is induced, and therefore, the incomplete combustion can effectively be reduced. Therefore, self-ignition can be performed stably also in the case where the gasoline injection amount in the compression stroke injection becomes small, and the low engine load part of the operating range of the engine 1 can be expanded.

Figure 9:
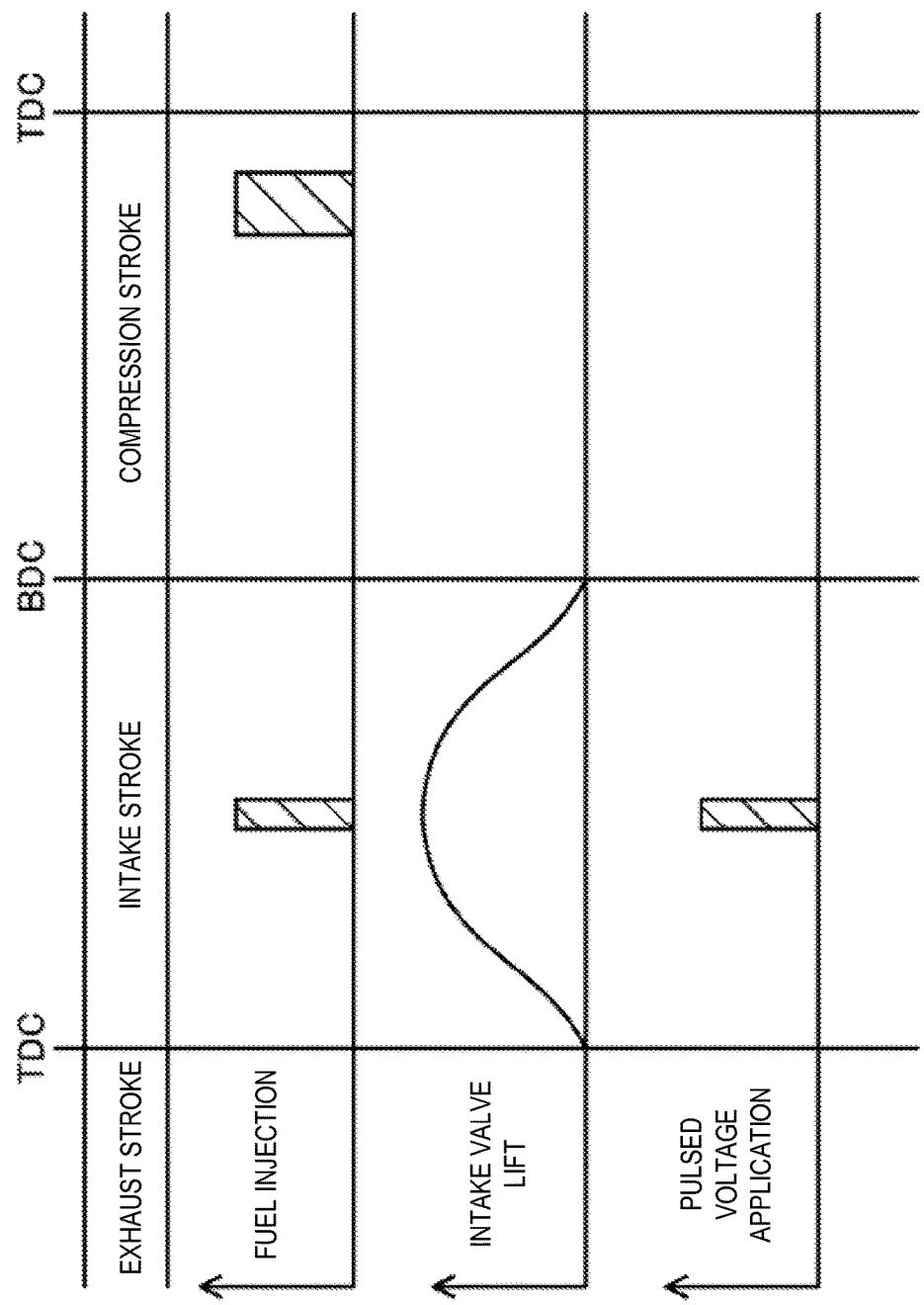
FIG. 9 is a schematic view illustrating an example of a control pattern.

FIG. 9 illustrates a specific example of such a control pattern. In this control pattern, since the small mass of the mixture gas is formed in the upper side of the central section of the combustion chamber 12, the gasoline is injected in the latter half of the compression stroke.

Further, on the intake stroke, the high-voltage control device 22 operates such that the short-pulsed high voltage is applied to the electrode 21b from slightly before to slightly after the timing at which the lift of the intake valve 8 reaches its highest (90 ATDC). The injector 7 is controlled to inject the slight amount of gasoline in synchronization to this.

Figure 10:
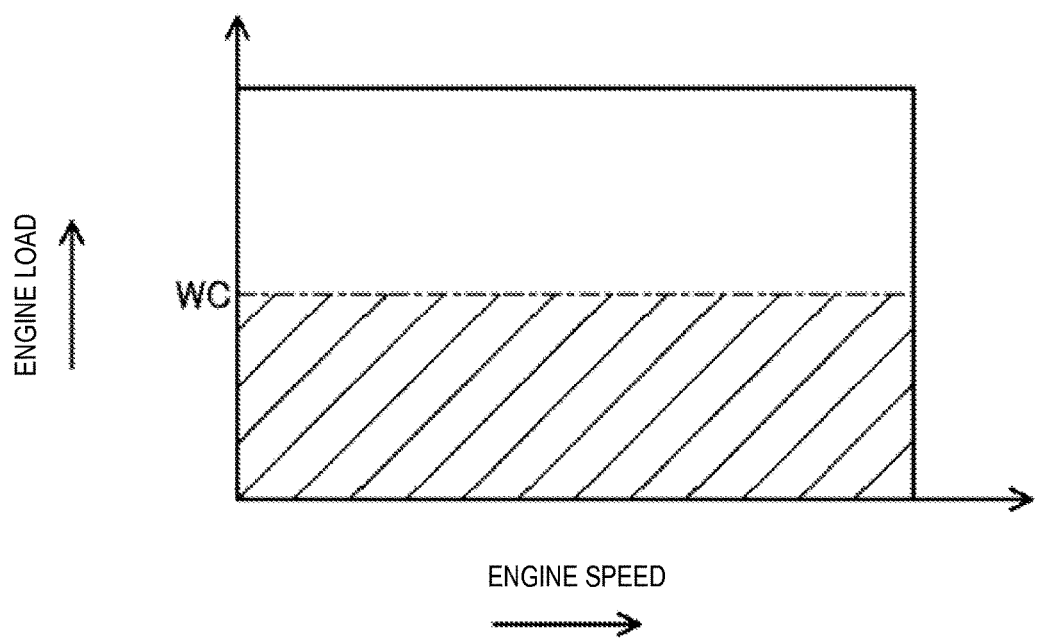
FIG. 10 is a schematic view illustrating an operating range of the engine in a simple manner.

As described above, this control pattern is used when the gasoline injection amount is relatively small. FIG. 10 illustrates the operating range of the engine 1 in a simplified manner, in which the vertical axis indicates a load (torque) of the engine 1 and the horizontal axis indicates a speed of the engine 1. In FIG. 10, "WC" indicates a central value of a load amount.

Here, within the operating range of the engine 1, a part where the engine load is lower than the central value WC (hatched part) is a low engine load part and a part where the engine load is higher than the central value WC is a high engine load part.

With the engine 1, within the low engine load part, since the gasoline injection amount becomes relatively small, the control pattern as described above is set, and further, within the high engine load part, since the gasoline injection amount in the compression stroke injection becomes relatively large, a control pattern in which the ozone is directly generated in the combustion chamber 12 on the compression stroke is set.

Specifically, with the engine 1, since the ozone can be generated by simply applying the voltage to the electrode 21b, the ozone is generated inside the sealed combustion chamber 12 on the compression stroke by simply changing the control pattern.

Figure 11:
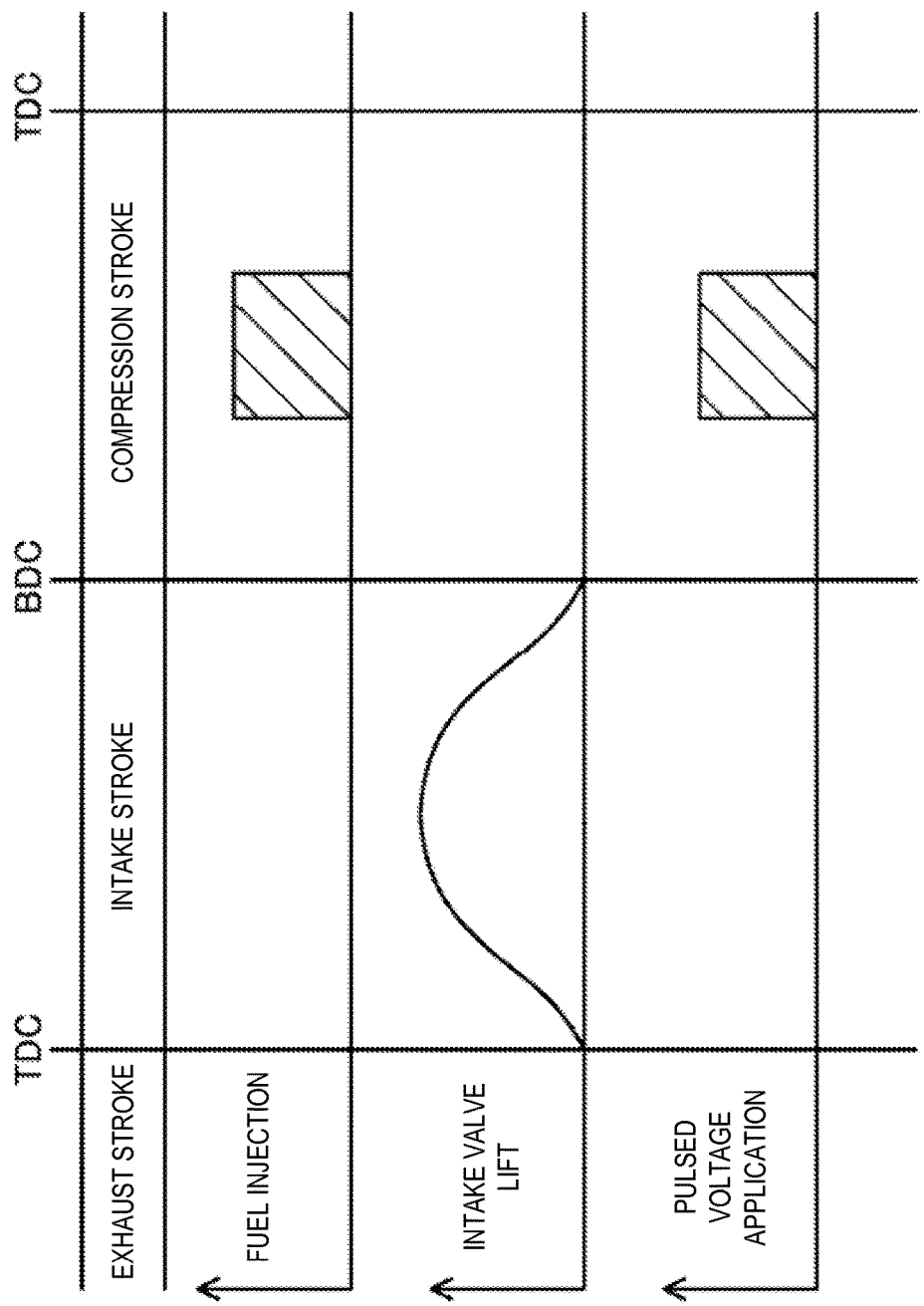
FIG. 11 is a schematic view illustrating an example of another control pattern.
Figure 12:
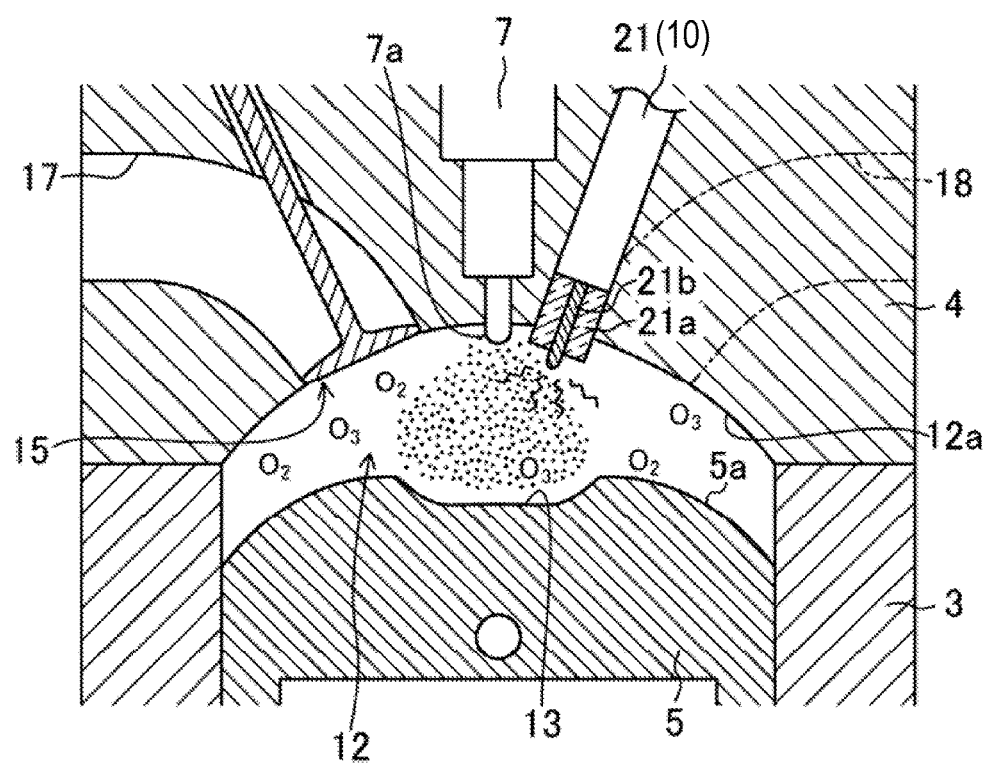
FIG. 12 is a schematic view illustrating compression stroke in the control pattern of FIG. 11.

Specifically, as illustrated in FIG. 11, the high-voltage control device 22 operates in synchronization with the compression stroke injection. In this manner, as illustrated in FIG. 12, even inside the sealed combustion chamber 12, the flow of the intake air occurs by the momentum of the injected gasoline. Thus, the matter within the electric discharge space switches between the generated ozone and the intake air, and ozone is generated while the high ozone generation efficiency is maintained.

Then, due to the combination of the ozone and the mixture gas, both having comparatively high concentrations, stable and efficient self-ignition can be performed. Thus, the complete combustion of the mixture gas is stimulated.

(Other Embodiments)

The gasoline direct-injection engine of the present invention is not limited to the above embodiment, and it may also include other various configurations.

For example, the gasoline of the fuel is not limited to be pure gasoline. As long as it contains gasoline, it may contain other component.

In combination with operating the high-voltage control device 22 and supplementarily injecting the gasoline on the intake stroke, also in the compression stroke injection, the high-voltage control device 22 may also operate in conjunction with the gasoline injection.

In this manner, the ignition stability can be improved by the ozone even more. For example, by adopting such a control pattern outside the high engine load part where the gasoline injection amount in the compression stroke injection is large, specifically, when the engine load is at the central value WC or within the low engine load part, stable CI combustion can realized over a wide part of the operating range of the engine 1.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine
2 Cylinder
5 Piston
7 Injector
8 Intake Valve
9 Exhaust Valve
10 Ozone Generating System
15 Inlet
16 Outlet
17 Intake Port
18 Exhaust Port
21b Electrode
22 High-voltage Control Device

What is claimed is:

1. A gasoline direct-injection engine where compression self-ignition combustion in which mixture gas containing gasoline self-ignites within an interior of a combustion chamber of a cylinder is performed, the engine comprising:
   the cylinder having a volume that changes as a piston reciprocates inside the cylinder;
   an injector for directly injecting fuel at least containing gasoline into the cylinder;
   an intake port for introducing intake air into the cylinder through an inlet;
   an exhaust port for discharging exhaust gas from inside of the cylinder through an outlet;
   an intake valve for opening and closing the inlet;
   an exhaust valve for opening and closing the outlet; and
   an ozone generating system for generating ozone inside the cylinder, including:
     an electrode projecting into the cylinder while being electrically insulated from walls of the cylinder except for a part of the electrode that is within the cylinder; and
     a high-voltage control device for applying a controlled pulse-shaped voltage to the electrode,
   wherein when the high-voltage control device is operated to apply the voltage onto the electrode, electric discharge occurs between the part of the electrode within the cylinder and the walls of the cylinder, and ozone is generated inside the cylinder due to an effect of the electric discharge,
   wherein a combustion pattern is provided for performing a compression stroke injection in which the injector injects the fuel on compression stroke, and causing the mixture gas formed by the fuel injection to self-ignite to combust,
   wherein when the combustion pattern is applied, ozone is generated by applying the voltage via the high-voltage control device onto the electrode during a period synchronized with the compression stroke injection, and
   wherein the injector is provided on the cylinder, adjacent to the electrode at a central part of a top surface of the combustion chamber facing the interior of the combustion chamber.

2. The engine of claim 1, wherein the compression stroke injection is performed such that the mixture gas concentrates to aggregate within a central space of the interior of the combustion chamber.

3. The engine of claim 2, wherein an air layer is formed between the mixture gas and an inner surface of the cylinder before a timing at which the mixture gas self-ignites.

4. The engine of claim 3, wherein the high-voltage control device is operated on an intake stroke when an injection amount of fuel is relatively small, and the high-voltage control device is operated on the compression stroke when the injection amount of fuel is relatively large.

5. The engine of claim 2, wherein injections of fuel on the compression stroke are performed on a second half of the compression stroke.

6. The engine of claim 1, wherein when the high-voltage control device is operated on an intake stroke, the fuel is injected on the intake stroke in conjunction with the operation of the high-voltage control device, by an amount smaller than an amount in the compression stroke injection.

7. The engine of claim 6, wherein an operating period of the high-voltage control device includes a period in which an introducing amount of the intake air reaches a largest amount.

8. The engine of claim 6, wherein the high-voltage control device is operated on the intake stroke when an injection amount of fuel is relatively small, and the high-voltage control device is operated on the compression stroke when the injection amount of fuel is relatively large.

9. The engine of claim 8, wherein an operating period of the high-voltage control device includes a period in which an introducing amount of the intake air reaches a largest amount.

10. The engine of claim 1, wherein the high-voltage control device is operated on the compression stroke in conjunction with the compression stroke injection.

11. The engine of claim 10, wherein the high-voltage control device is operated on an intake stroke when an injection amount of fuel is relatively small, and the high-voltage control device is operated on the compression stroke when the injection amount of fuel is relatively large.

12. The engine of claim 1, wherein the high-voltage control device is operated on an intake stroke when an injection amount of fuel is relatively small, and the high-voltage control device is operated on the compression stroke when the injection amount of fuel is relatively large.

13. A gasoline direct-injection engine where compression self-ignition combustion in which mixture gas containing gasoline self-ignites within an interior of a combustion chamber of a cylinder is performed, the engine comprising:
   the cylinder having a volume that changes as a piston reciprocates inside the cylinder;
   an injector for directly injecting fuel at least containing gasoline into the cylinder;
   an intake port for introducing intake air into the cylinder through an inlet;
   an exhaust port for discharging exhaust gas from inside of the cylinder through an outlet;
   an intake valve for opening and closing the inlet;
   an exhaust valve for opening and closing the outlet; and
   an ozone generating system for generating ozone inside the cylinder, including:

an electrode projecting into the cylinder while being electrically insulated from walls of the cylinder except for a part of the electrode that is within the cylinder; and a high-voltage control device for applying a controlled pulse-shaped voltage to the electrode, wherein when the high-voltage control device is operated to apply the voltage onto the electrode, electric discharge occurs between the part of the electrode within the cylinder and the walls of the cylinder, and ozone is generated inside the cylinder due to an effect of the electric discharge, wherein a combustion pattern is provided for performing a compression stroke injection in which the injector injects the fuel on compression stroke, and causing the mixture gas formed by the fuel injection to self-ignite to combust, wherein when the combustion pattern is applied, ozone is generated by applying the voltage via the high-voltage control device onto the electrode during a period synchronized with the compression stroke injection, wherein the injector is provided on the cylinder, adjacent to the electrode at a central part of a top surface of the combustion chamber facing the interior of the combustion chamber, wherein the injector injects the fuel on an intake stroke when an engine load is below a predetermined load value, and injects the fuel on the compression stroke when the engine load is at or above the predetermined load value, and wherein ozone is generated by applying the voltage via the high-voltage control device onto the electrode during a period synchronized with the intake stroke injection, when the engine load is below the predetermined load value.

14. The engine of claim 13, wherein when the engine load is below the predetermined load value, injections of fuel are divided to be performed on the intake stroke and the compression stroke, and ozone is not generated on the compression stroke.

* * * * *